(12) United States Patent
Narasimha et al.

(10) Patent No.: US 8,666,417 B2
(45) Date of Patent: Mar. 4, 2014

(54) METHOD AND APPARATUS FOR DISTINGUISHING CELLS WITH THE SAME PHYSICAL CELL IDENTIFIER

(75) Inventors: Murali Narasimha, Lake Zurich, IL (US); Sandeep Krishnamurthy, Arlington Heights, IL (US); Ravi Kuchibhotla, Gurnee, IL (US)

(73) Assignee: Motorola Mobility LLC, Libertyville, IL (US)

( * ) Notice: Subject to any disclaimer, the term of this patent is extended or adjusted under 35 U.S.C. 154(b) by 999 days.

(21) Appl. No.: 12/404,660

(22) Filed: Mar. 16, 2009

(65) Prior Publication Data

US 2010/0234028 A1 Sep. 16, 2010

(51) Int. Cl.
*H04W 36/00* (2009.01)

(52) U.S. Cl.
USPC .......... 455/437; 455/436; 455/438; 455/439; 455/440; 455/441; 455/442; 455/443; 455/444

(58) Field of Classification Search
USPC ................................................ 455/436–444
See application file for complete search history.

(56) References Cited

U.S. PATENT DOCUMENTS

| 6,704,547 | B2 | 3/2004 | Kuwahara et al. | |
|---|---|---|---|---|
| 7,218,893 | B2 | 5/2007 | Larsson et al. | |
| 2002/0009974 | A1 | 1/2002 | Kuwahara et al. | |
| 2003/0007470 | A1* | 1/2003 | Grilli et al. | 370/335 |
| 2004/0082344 | A1* | 4/2004 | Moilanen et al. | 455/456.3 |
| 2005/0192011 | A1* | 9/2005 | Hong et al. | 455/440 |
| 2008/0125125 | A1 | 5/2008 | Choi et al. | |
| 2008/0220779 | A1 | 9/2008 | Bose | |
| 2008/0220782 | A1 | 9/2008 | Wang et al. | |
| 2009/0132675 | A1* | 5/2009 | Horn et al. | 709/207 |
| 2009/0316655 | A1* | 12/2009 | Prakash et al. | 370/331 |
| 2010/0197277 | A1* | 8/2010 | Jung et al. | 455/411 |

OTHER PUBLICATIONS

Motorola; Identification and Measurement of CSG Cells; Feb. 11-15, 2008, Sorrento, Italy.
TSG; LS on RRC Connection Re-Establishment; Aug. 18-22, 2008; Jeju, Korea.
Huawei; Detection of Conflicting Cell Identifies; Oct. 8-11, 2007; Sophia Antipolis, France.
TSG-SA WG3; LS on PCI Clarification; Sep. 29-Oct. 3, 2008; Prague, Czech Republic.

* cited by examiner

*Primary Examiner* — Jinsong Hu
*Assistant Examiner* — Michael Nguyen

(57) ABSTRACT

A method (700, 800) and apparatus (500, 600) for distinguishing cells with the same physical cell identifier is disclosed. The method can include receiving (820) a handover request message including target cell timing offset information at a potential target cell base station, where the potential target cell base station can have a physical cell identifier. The method can include comparing (830) the received target cell timing offset information with stored timing offset information at the potential target cell base station. The method can include sending (840) a handover request accept message if the received target cell timing offset information is substantially equal to the stored timing offset information. The method can also include receiving (720), at a wireless terminal, a target cell physical cell identifier and determining (730) a target cell timing offset of a radio frame of the target cell with respect to reference timing of a serving cell. The method can include sending (740) a measurement report including the target cell physical cell identifier and the target cell timing offset.

18 Claims, 10 Drawing Sheets

METHOD AND APPARATUS FOR DISTINGUISHING CELLS WITH THE SAME PHYSICAL CELL IDENTIFIER

BACKGROUND

1. Field

The present disclosure is directed to a method and apparatus for distinguishing cells with the same physical cell identifier. More particularly, the present disclosure is directed to distinguishing cells with the same physical cell identifier by using a radio frame timing offset.

2. Introduction

Presently, in a cellular network, cells use physical cell identifiers to distinguish themselves from each other. An operator ensures that a physical cell identifier unambiguously identifies a base station. However, Closed Subscriber Group (CSG) base stations, such as access points, may use the same physical cell identifiers, which can result in physical cell identifier confusion. For example, CSG cells can be a collection of cells used for deployment in a campus or can be individual cells used for deployment in users' homes. The CSG cells co-exist with macro cells on the same carrier frequency. CSG cells have a smaller coverage area than macro cells. Unlike macro cells, the CSG cells are un-planned, in that the operator has much less control over their placement and configuration than with macro cells. Thus, two CSG cells that are located within the coverage of the same macro cell can use the same physical cell identifiers. Unfortunately, this results in physical cell identifier confusion.

To elaborate, a mobile station uses physical cell identifiers (PCID) during synchronization and during cell ranking. The mobile station ranks cells by measuring the received signal strength and then uses the ranking to facilitate handover and reselection. If a PCID is not guaranteed to be unique within a macro cell, then PCIDs cannot be used for reselection and handover. If PCIDs cannot be used for reselection and handover, a mobile terminal would need to read system information of the target cell and acquire the cell global identity to determine if it is allowed to access the cell. Unfortunately, this requires considerable additional battery usage in idle mode and can seriously impact battery life. Another problem with using the same PCIDs is that mobile station cell handover will fail when there is more than one cell with the same PCID and a network cannot determine which cell is the right one for handover.

A range of PCIDs can be reserved for CSG cells. Also, a mobile terminal can have a list of CSG PCIDs, such as a CSG white-list of cells that it is allowed to access. These restrictions limit the problem in the reselection case to when the target cell is a CSG cell in the CSG white-list. However, PCID confusion can still frequently occur in metropolitan areas where more CSG cells are deployed. Even in cases where the spatial likelihood of PCID confusion is low, when confusion occurs, it affects the same mobile terminal repeatedly. For example, if two homes within the coverage of the same macro cell use CSG cells with the same PCID, the corresponding users will experience handover failures when entering their homes and they will have substantially higher battery drain.

In order to resolve the PCID confusion, a mobile terminal could read additional system information of a cell, which contains a unique cell identifier, which the mobile terminal could rely on to determine if the cell is suitable. Unfortunately, reading the additional system information in connected mode would cause substantial delay which negatively impacts handover performance. Also, a mobile terminal would have to read the additional system information every time it encounters a CSG PCID, because different encounters with the same PCID could correspond to different cells. Furthermore, the mobile terminal would lose data being sent through the serving cell as a result of reading the additional system information because the mobile terminal would have to synchronize to the target cell.

It is also possible to ignore a cell based on the PCID if it has been found to be unsuitable after previously reading additional system information. However, this would not resolve the PCID confusion problem because a cell encountered later may be suitable to the mobile terminal but would be ignored if it has same PCID as a previously unsuitable cell. Furthermore, in connected mode, a mobile terminal would not measure and report the ignored PCIDs and the network would not know when interference from the PCID is significant and would not be able to take measures to prevent disruption of service.

Thus, there is a need for a method and apparatus for distinguishing cells with the same physical cell identifier.

SUMMARY

A method and apparatus for distinguishing cells with the same physical cell identifier is disclosed. The method can include receiving a handover request message including target cell timing offset information at a potential target cell base station, where the potential target cell base station can have a physical cell identifier. The method can include comparing the received target cell timing offset information with stored timing offset information at the potential target cell base station. The method can include sending a handover request accept message if the received target cell timing offset information is substantially equal to the stored timing offset information. The method can also include receiving, at a wireless terminal, a target cell physical cell identifier and determining a target cell timing offset of a radio frame of the target cell with respect to reference timing of a serving cell. The method can include sending a measurement report including the target cell physical cell identifier and the target cell timing offset.

BRIEF DESCRIPTION OF THE DRAWINGS

In order to describe the manner in which advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1:
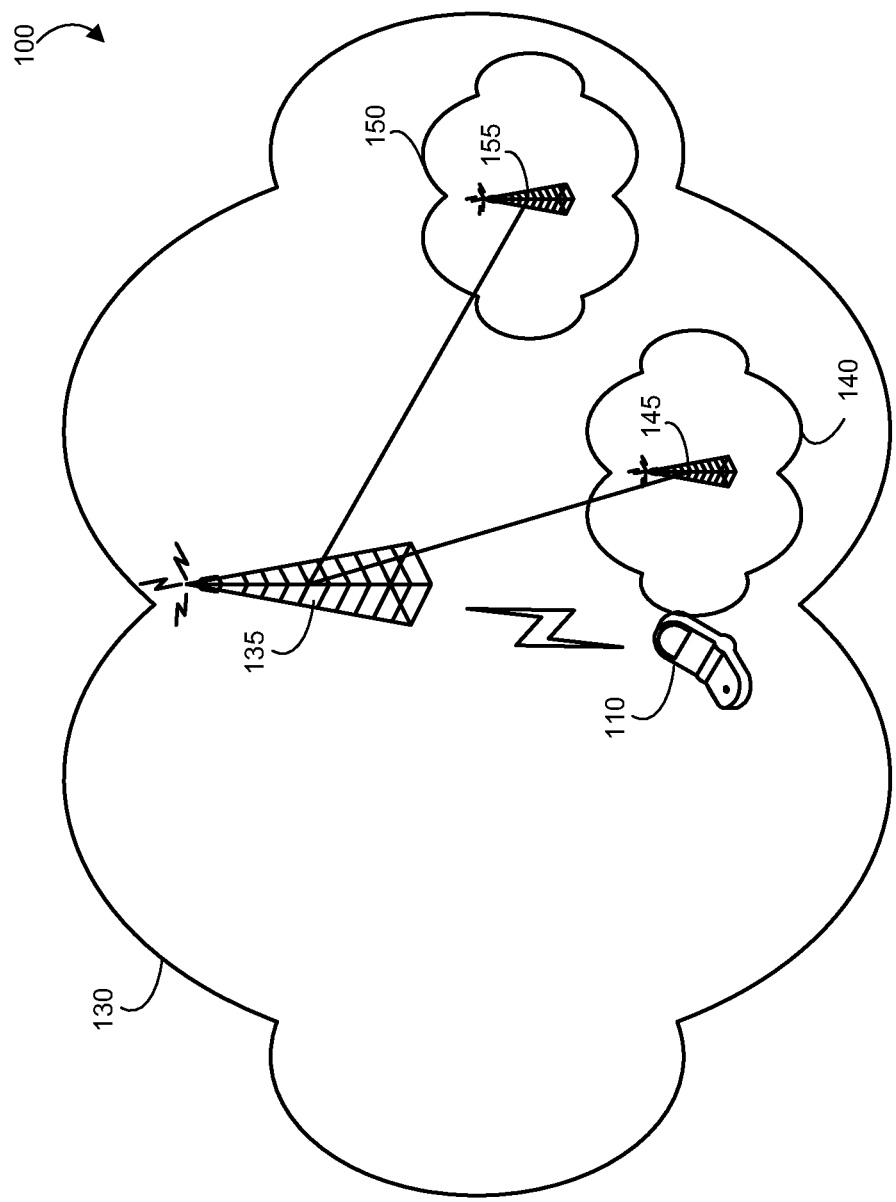
FIG. 1 is an exemplary block diagram of a system according to a possible embodiment.

FIG. 1 is an exemplary block diagram of a system 100 according to a possible embodiment. The system 100 can include a terminal 110, a serving or macro cell 130 including a base station 135, a first target or home cell 140, and a second target or home cell 150. The terminal 110 may be a wireless communication device, such as a wireless telephone, a cellular telephone, a personal digital assistant, a pager, a personal computer, a selective call receiver, or any other device that is capable of sending and receiving communication signals on a network including wireless network. The first target cell 140 and the second target cell 150 can be closed subscriber group (CSG) cells and can include their own respective base stations or access points 145 and 155. The first target cell 140 and the second target cell 150 can have the same physical cell identifier (PCID). The first target cell 140 and the second target cell 150 can be located within a coverage area of the serving cell 130. Also, the coverage area of the first target cell 140 may or may not overlap the coverage area of the second target cell 150.

The system 100 can be a wireless telecommunications network, such as a Time Division Multiple Access (TDMA) network, like a $3^{rd}$ Generation Partnership Project (3GPP) Long Term Evolution (LTE) network, can be a Universal Mobile Telecommunications System (UMTS), and/or can be other like communications systems. Furthermore, the system 100 may include more than one network and may include a plurality of different types of networks.

One or both of the base stations 145 and 155 can be a potential target cell base station, such as a home base station, like a user base station, a home NodeB, a Third Generation Partnership Project (3GPP) home NodeB and/or can be a closed subscriber group (CSG) base station, as defined in a third generation partnership project based standard or can be any other home base station. A third generation partnership project home NodeB can also be a long term evolution (LTE) closed subscriber group base station based on present third generation partnership project long term evolution closed subscriber group base station features. A long term evolution closed subscriber group base station can include any base station that is a present or future result of present and/or future modified third generation partnership project long term evolution closed subscriber group base station features. A home base station can also be a Universal Mobile Telecommunications System (UMTS) home base station.

In operation, the timing of the radio frames can be used to distinguish between cells even when they have the same physical cell identifier. A range of physical cell identifiers can be reserved for closed subscriber group cells, such as the target cells 140 and 150, and the terminal 110 can be aware of the range of physical cell identifiers. The terminal 110 can also have a closed subscriber group white list that includes a list of closed subscriber group cell physical cell identifiers that that terminal 110 has access to.

If the terminal 110 is in idle mode, the terminal 110 can search for and rank cells based on received signal strength criteria. If a physical cell identifier, P, such as a physical cell identifier of the target cell 140, that is in the closed subscriber white-list is found, then the terminal 110 can store the timing offset, T, of the radio frame of the cell with respect to radio frames of the serving cell 130. The terminal 110 can then read system information to determine if it is allowed to access the target cell 140. The terminal 110 can use the pair (P, T) to identify the target cell 140. If the terminal 110 finds another cell with the same physical cell identifier, P, it can compare timing offsets to determine whether it has already found the cell.

Furthermore, if a cell corresponding to, for example, (P, $T_1$), is found to be not suitable, (P, $T_1$) can be stored in the terminal 110. If the terminal 110 again encounters the physical cell identifier P, it can determine the corresponding timing offset $T_2$. If $T_1=T_2$ within a certain accuracy, the terminal 110 can conclude that the newly encountered physical cell identifier P corresponds to previously seen cell, and can ignore the cell and not reselect to the cell regardless of the cell's ranking. If $T_1 \neq T_2$, within a certain accuracy, the terminal 110 can conclude that the newly encountered physical cell identifier does not correspond to the previously seen cell and may reselect to the new cell. When the serving cell changes and cell reselection occurs, the terminal 110 can erase all stored (P, T) pairs.

In connected mode, the terminal 110 can measure candidate cells for handover. If a terminal 110 finds and measures a candidate target cell, such as the cell 140, it can send a measurement report to the serving cell 130. The measurement report can include the radio frame time offset of the cell 140 with respect to the serving cell 130. The source base station 135 at the serving cell 130 can prepare all potential target base stations, such as base stations 145 and 155, that have the reported physical cell identifier by sending them a handover request that includes the radio frame time offset reported by the terminal 110. The target cells 140 and 150 can then check the radio frame time offset and one can accept the handover request if the time offset is substantially equal to its radio frame time offset with respect to the terminal's serving cell 130. If the handover request is accepted, the source base station 135 can send a handover command to the terminal 110 instructing the terminal 110 to hand over to the target cell 140 that both has the physical cell identifier and transmits radio frames at the time offset.

In order to determine its own radio frame time offset relative to the serving or macro cell 130, a target or home cell 140 can have the capability to receive a downlink signal from the macro cell 130. Alternatively, the radio frame time offset can be programmed into the home cell 140 so that it always uses the same offset relative to the macro cell 130. Also, a home cell 140 can store its radio frame time offset with respect to more than one cell, which can be useful in cases where a home cell is placed at the edge of coverage of a cell and also in cases when there are no macro cells and handovers occur between home cells, such as cells 140 and 150.

If a home cell 140 does not have a downlink receiver, a terminal 110 connected to the home cell 140 can be used to obtain radio frame time offsets relative to macro cells. For example, the terminal 110 can measure macro cell 130 timing information and report it to the home cell 140, which can store the radio frame timing offsets with respect to each relevant macro cell.

If a home cell 140 does not have a downlink receiver and/or it does not have any terminals connected to it, it may not know its own radio frame timing offset. In this case, an additional cell identifier, such as a closed subscriber group identifier or a global cell identifier, of the home cell 140 can be used to correctly identify it. To do this, a terminal 110 can send a measurement report, which can include the radio frame time offset of the home cell 140 with respect to the serving cell 130. The source base station 135 can send a handover request to all the potential target home base stations 140 and 150 that have the reported physical cell identifier by sending a handover request that includes the radio frame time offset reported by the terminal 110. If the potential target home cell 140 does not know its radio frame time offset relative to the terminal's serving cell 130, it can send an indication to the source base station 135 requesting an additional cell identifier check. The source base station 135 can request the terminal 110 to determine the additional cell identifier of the reported home cell 140 and the source base station 135 can assign a suitable measurement gap to enable the terminal 110 to read system information of the home cell 140. The terminal 110 can read system information of the home cell 140 and report the additional cell identifier to the serving cell 130. The source base station 135 at the serving cell 130 can send a message to the potential target base station 145 that sent the indication requesting the additional cell identifier. The message can include the additional cell identifier reported by the terminal 110. If the handover request is accepted, the source base station 135 can send a handover command to the terminal 110. The target base station 145 can then record its radio frame timing offset so that other handovers do not require terminals to read and report the additional cell identifier information.

Figure 2:
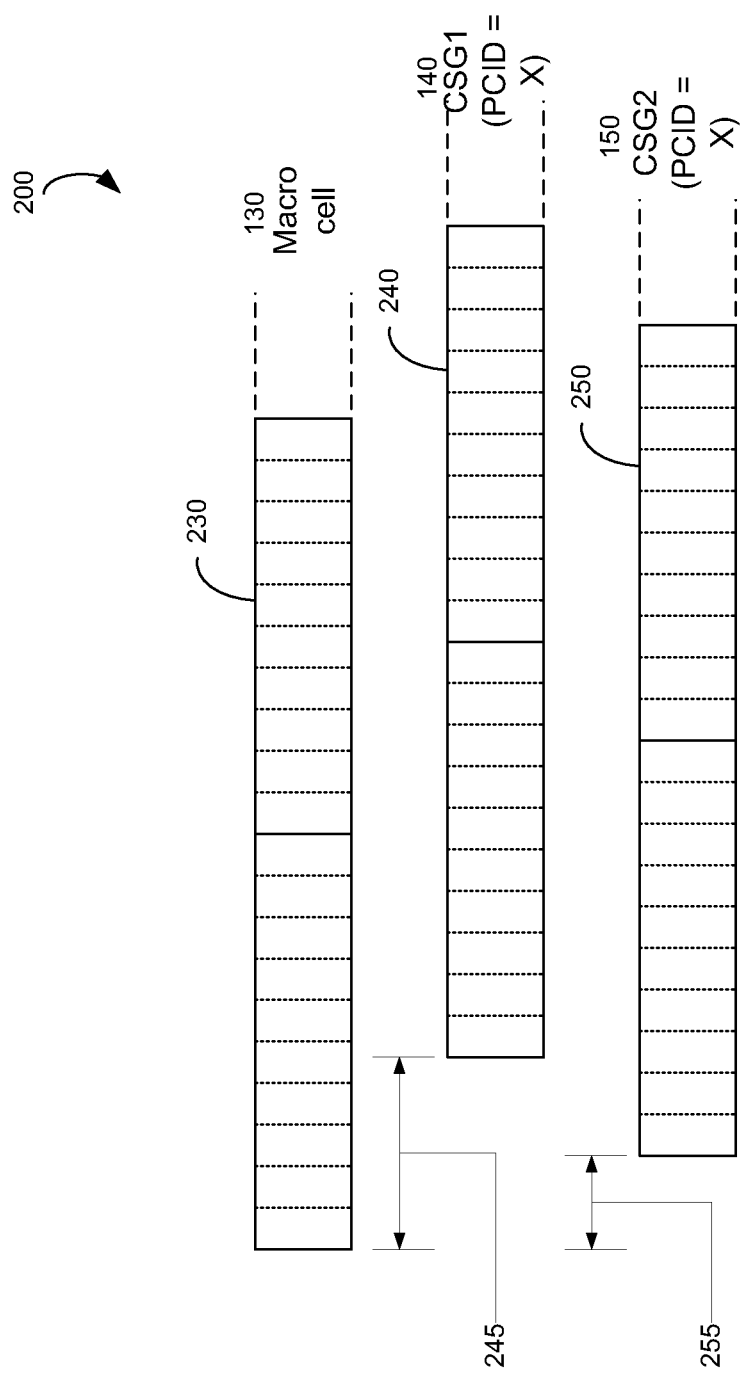
FIG. 2 is an exemplary timing offset illustration according to a possible embodiment.

FIG. 2 is a timing offset illustration 200 according to one embodiment. Radio frame transmissions 240 from a home cell 140 can have a radio frame timing offset 245 relative to radio frame transmissions 230 from the serving macro cell 130. Also, radio frame transmissions 250 from a home cell 150 can have a radio frame timing offset 255 relative to radio frame transmissions 230 from the serving cell 130. The radio frame transmissions 240 from the home cell 140 can also be offset from radio frame transmissions 250 from the home cell 150. The timing offsets 245 and 255 can be used to distinguish one home cell 140 from another home cell 150 when the home cells 140 and 150 have the same physical cell identifier X.

Figure 3:
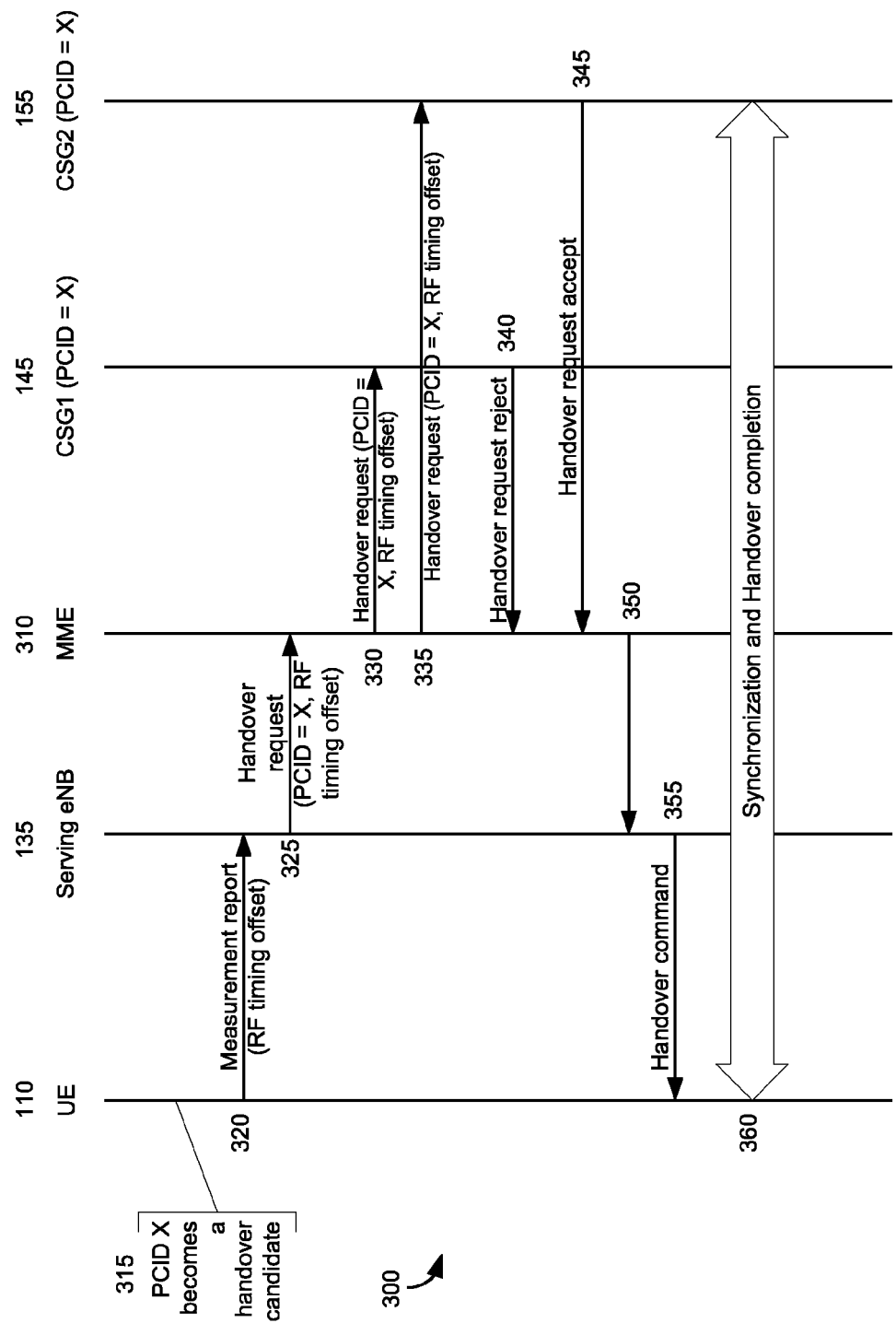
FIG. 3 is an exemplary signal flow diagram according to a possible embodiment.

FIG. 3 is an exemplary signal flow diagram 300 according to one embodiment. The signal flow diagram 300 illustrates signals between the terminal 110, such as user equipment, the serving base station 135, such as a serving eNodeB, a mobility management entity 310, the home base station 145, such as a first home base station at a first closed subscriber group cell with a physical cell identifier X, and a home base station 155, such as a second home base station at a second closed subscriber group cell with the same physical cell identifier X. The mobility management entity 310 is not necessary and signals and messages can be transmitted substantially directly between the serving base station 135 and home base stations 145 and 155.

In operation, at 315, a cell with the physical cell identifier X becomes a handover candidate. At 320, terminal 110 can send a measurement report for a cell with the physical cell identifier X, the measurement report including a radio frame timing offset, to the serving base station 135. At 325, the serving base station 135 can send a handover request including the physical cell identifier and the radio frame timing offset to the mobility management entity 310. At 330 and 335, the mobility management entity 310 can forward the handover request to the home base stations 145 and 155. At 340, the home base station 145 can send a handover request reject message to the mobility management entity 310 if it does not transmit with the radio frame timing offset from the handover request. At 345, the home base station 155 can send a handover request accept message to the mobility management entity 310 if it transmits with the radio frame timing offset from the handover request. At 350, the mobility management entity can forward the handover request accept message to the serving base station 135. At 355, the serving base station 135 can send a handover command to the terminal 110. At 360, the terminal 110 and the target home base station 155 can synchronize and complete the handover.

Figure 4:
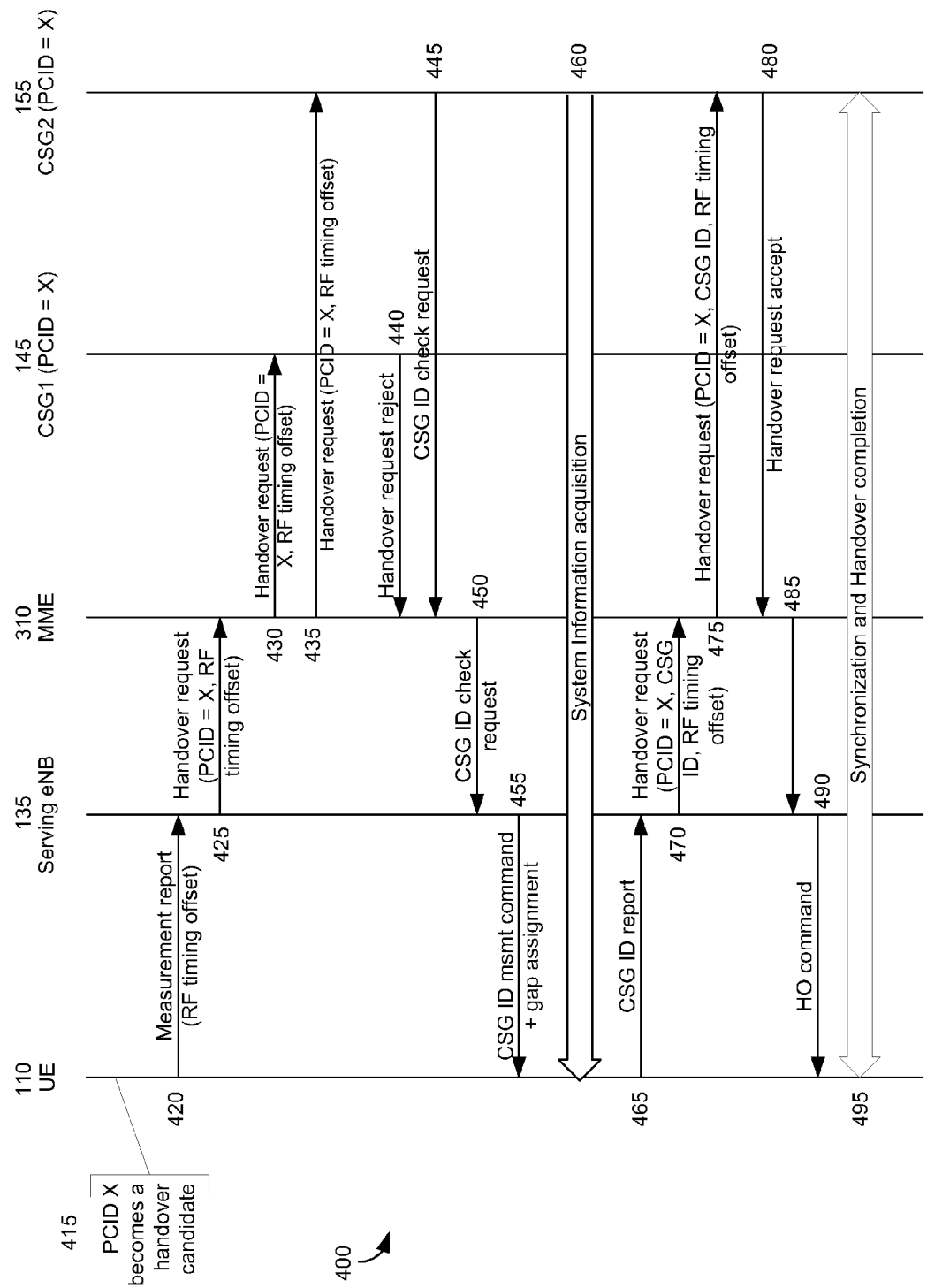
FIG. 4 is an exemplary signal flow diagram according to a possible embodiment.

FIG. 4 is an exemplary signal flow diagram 400 according to one embodiment. The signal flow diagram 400 illustrates signals between the terminal 110, such as user equipment, the serving base station 135, such as a serving eNodeB, a mobility management entity 310, the home base station 145, such as a first home base station at a first closed subscriber group cell with a physical cell identifier X, and a home base station 155, such as a second home base station at a second closed subscriber group cell with the same physical cell identifier X. The mobility management entity 310 is not necessary and signals and messages can be transmitted substantially directly between the serving base station 135 and home base stations 145 and 155.

In operation, at 415, a cell with the physical cell identifier X becomes a handover candidate. At 420, terminal 110 can send a measurement report for a cell with the physical cell identifier X, the measurement report including a radio frame timing offset, to the serving base station 135. At 425, the serving base station 135 can send a handover request including the physical cell identifier and the radio frame timing offset to the mobility management entity 310. At 430 and 435, the mobility management entity 310 can forward the handover request to the home base stations 145 and 155. At 440, the home base station 145 can send a handover request reject message to the mobility management entity 310 if it does not transmit with the radio frame timing offset from the handover request. At 445, the home base station 155 can send an additional cell identifier check request to the mobility management entity 310 if it does not know its radio frame timing offset. At 450, the mobility management entity 310 can forward the additional cell identifier check request to the serving base station 135. At 455, the serving base station 135 can send an additional cell identifier measurement command and gap assignment to the terminal 110. At 460, the terminal 110 can acquire system information from the home base station 155. At 465, the terminal 110 can send an additional cell identifier report to the serving base station 135. At 470, the serving base station 135 can send a message to the mobility management entity 310, which can be forwarded to the home base station 155 at 475. The message can include the additional cell identifier, such as a closed subscriber group identifier, and can include the radio frame timing offset.

At 480, the home base station 155 can send a handover request accept message to the mobility management entity 310 if it matches the additional cell identifier from the handover request. At 485, the mobility management entity 310 can forward the handover request accept message to the serving base station 135. At 490, the serving base station 135 can send a handover command to the terminal 110. At 495, the terminal 110 and the target home base station 155 can synchronize and complete the handover.

Figure 5:
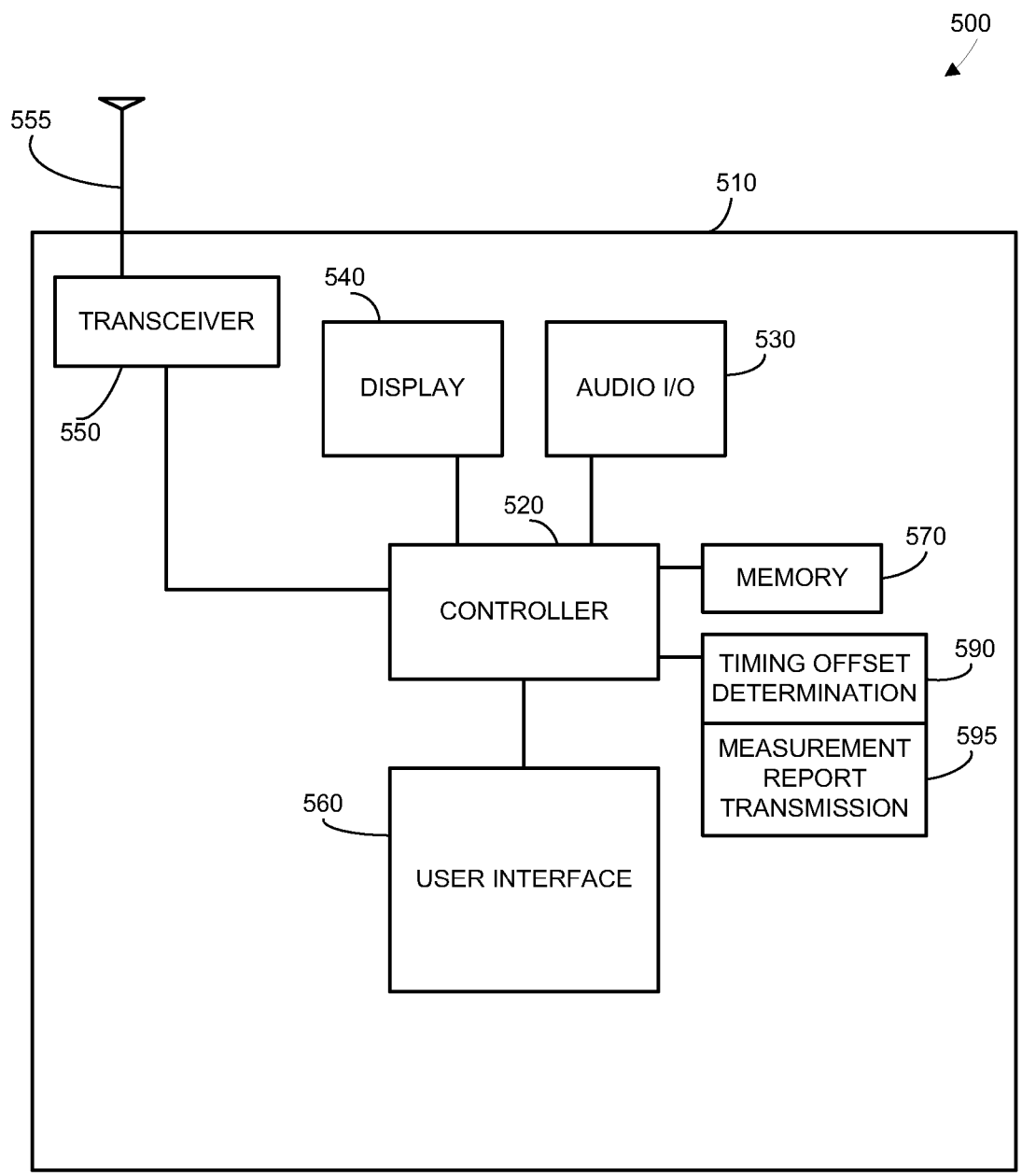
FIG. 5 is an exemplary block diagram of a wireless communication device according to a possible embodiment.

FIG. 5 is an exemplary block diagram of a wireless communication device 500, such as the terminal 110, according to a possible embodiment. The wireless communication device 500 can include a wireless communication device housing 510, a wireless communication device controller 520 coupled to the wireless communication device housing 510, audio input and output circuitry 530 coupled to the wireless communication device housing 510, a display 540 coupled to the wireless communication device housing 510, a wireless communication device transceiver 550 coupled to the wireless communication device housing 510 and coupled to the wireless communication device controller 520, an antenna 555 coupled to the wireless communication device transceiver 550, a user interface 560 coupled to the wireless communication device housing 510, and a memory 570 coupled to the wireless communication device housing 510. The wireless communication device 500 can also include a timing offset determination module 590 and a measurement report transmission module 595. The timing offset determination module 590 and the measurement report transmission module 595 can be coupled to the controller 520 by residing within the controller 520, by residing within the memory 570, by being autonomous modules, and can be software, can be hardware, or can be in any other format useful for a module on a wireless communication device 500.

The display 540 can be a liquid crystal display (LCD), a light emitting diode (LED) display, a plasma display, or any other means for displaying information. The wireless communication device transceiver 550 can include a transmitter and/or a receiver. The audio input and output circuitry 530 can include a microphone, a speaker, a transducer, or any other audio input and output circuitry. The user interface 560 can include a keypad, buttons, a touch pad, a joystick, an additional display, or any other device useful for providing an interface between a user and an electronic device. The memory 570 may include a random access memory, a read only memory, an optical memory, a subscriber identity module memory, or any other memory that can be coupled to a wireless communication device.

In operation, the wireless communication device transceiver 550 can be configured to receive a target cell physical cell identifier. The wireless communication device controller 520 can be configured to control operations of the wireless communication device 500 and can be configured to perform other elements of the disclosed methods for a wireless communication device. The timing offset determination module 590 can be configured to determine a target cell timing offset of a radio frame of the target cell with respect to a reference timing of a serving cell. The timing offset determination module 590 can be configured to determine a target cell timing offset by measuring a timing of a radio frame from a target cell base station signal from the target cell to determine the timing offset with respect to the reference timing of a serving cell. The measurement report transmission module 595 can be configured to transmit a measurement report including the target cell physical cell identifier and the target cell timing offset.

Figure 6:
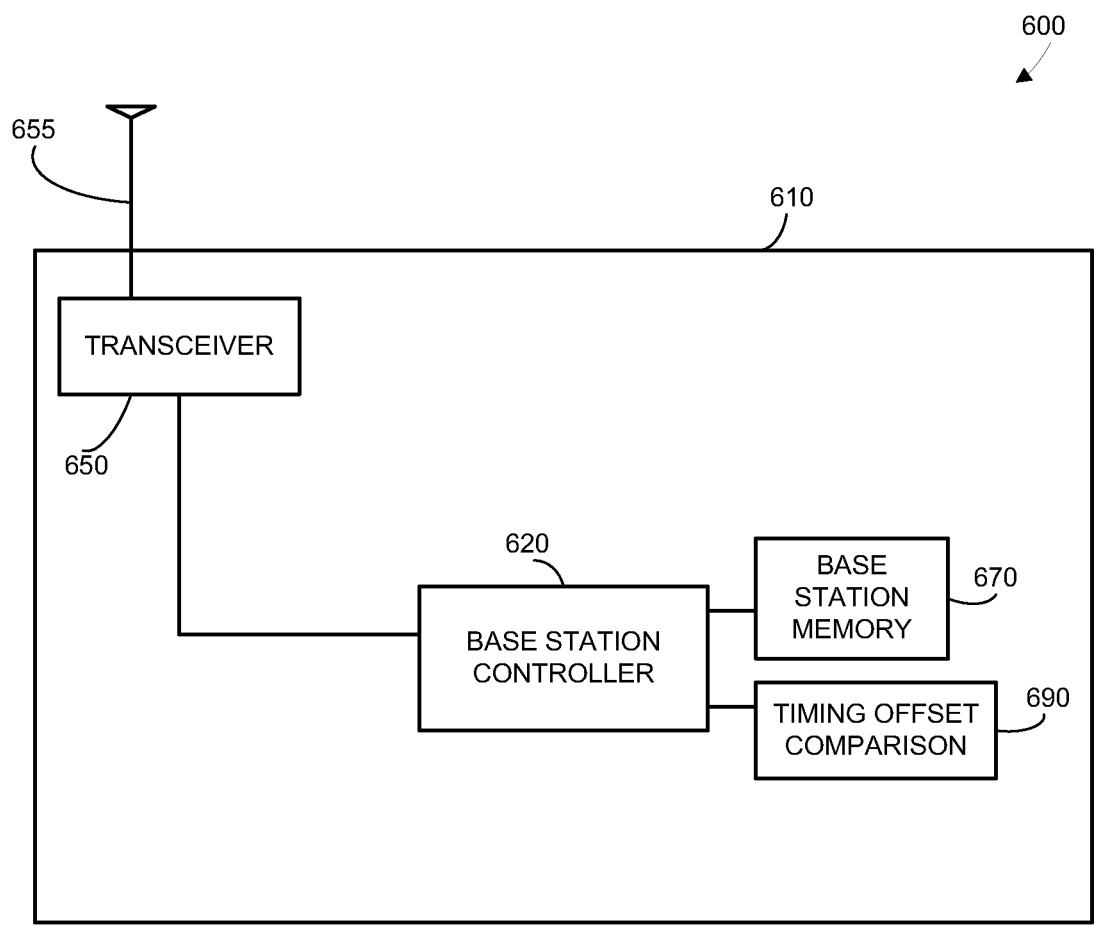
FIG. 6 is an exemplary block diagram of a base station according to a possible embodiment.

FIG. 6 is an exemplary block diagram of a base station 600, such as the base station 145, according to a possible embodiment. The base station 600 can be a third generation partnership project home NodeB having a physical cell identifier, can be a home cell base station, can be a user base station, can be a closed subscriber group base station, or can be any other base station that may have a physical cell identifier similar to another base station within a similar coverage area, such as within a coverage area of a macro cell, such as a serving cell. The base station 600 can include a base station housing 610, a base station memory 670, a base station controller 620 coupled to the base station housing 610 and coupled to the base station memory 670, at least one base station transceiver 650 coupled to the base station controller 620, an antenna 655 coupled to the base station transceiver 650, and a timing offset comparison module 690 coupled to the base station controller 620. The base station transceiver 650 can be a wireless or a wired transceiver and can include one or more transceivers.

In operation, the base station memory 670 can be configured to store a physical cell identifier and store timing offset information. The base station controller 620 can be configured to control operations of the base station 600. The base station transceiver 650 can be configured to receive a handover request message including target cell timing offset information. The timing offset comparison module 690 can be configured to compare the received target cell timing offset information with the stored timing offset information. The base station transceiver 650 can be configured to send a handover request accept message if the received target cell timing offset information is substantially equal to the stored timing offset information. The base station transceiver 650 can be configured to send a handover request reject message if the received target cell timing offset information is substantially different from the stored timing offset information. The base station controller 620 can also receive the messages from the base station transceiver 650 and can prepare the other messages and send them to the base station transceiver 650.

The base station controller 620 can be configured to determine timing offset information of transmitted radio frames of the base station 600 with respect to a second base station, such as the base station 135, and can be configured to store, in the base station memory 670, the timing offset information of the transmitted radio frames of the base station 600. The base station controller 620 can also determine that timing offset information has not been stored in the base station memory 670. The base station transceiver 650 can then send an additional cell identifier request message if the timing offset information is not stored in the base station memory 670 and can receive an additional cell identifier in response to sending the additional cell identifier request message. The base station controller 620 can then determine that the received additional cell identifier is equal to an additional cell identifier of the base station 600 and can store the received target cell timing offset information in the base station memory 670 if the received additional cell identifier is equal to the additional cell identifier of the base station 600. The base station controller 620 can also determine the received additional cell identifier is not equal to an additional cell identifier of base station 600. The base station transceiver 650 can then send a handover request reject message if the received additional cell identifier is not equal to the additional cell identifier of the base station 600. The additional cell identifier can be a closed subscriber group cell identifier, a global identifier cell identifier, and/or any other additional identifier used to identify a cell or a base station. The base station controller 620 and the base station transceiver 650 can also be configured to perform other elements of the other methods either along with, or independent from these elements.

Figure 7:
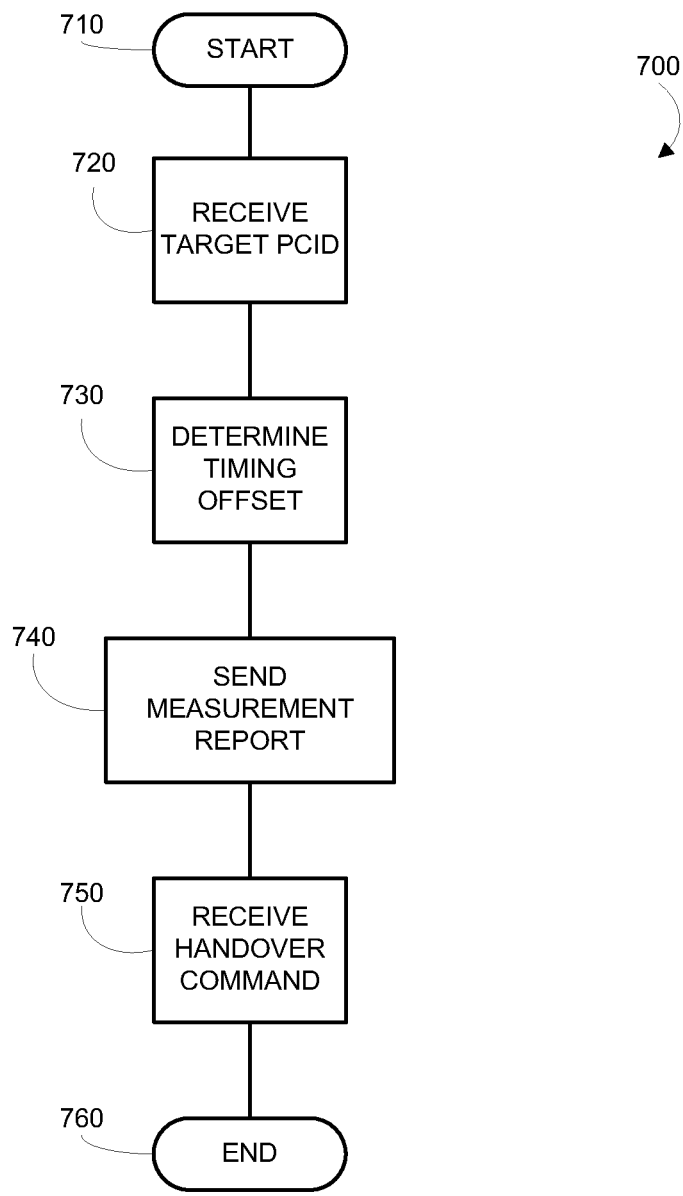
FIG. 7 is an exemplary flowchart illustrating the operation of a terminal according to a possible embodiment.

FIG. 7 is an exemplary flowchart 700 illustrating the operation of the terminal 110 according to a possible embodiment. At 710, the flowchart 700 begins. At 720, a target cell physical cell identifier can be received. At 730, a target cell timing offset of a radio frame of the target cell can be determined with respect to reference timing of a serving cell. The serving cell can be a macro cell or serving cell that includes one or more target cells. The target cell timing offset can be determined by measuring a timing of a radio frame from a first target cell target base station signal to determine the timing offset with respect to the reference timing of the serving cell. At 740, a measurement report including the target cell physical cell identifier and the target cell timing offset can be sent. At 750, a handover command can be received from a base station of the serving cell to initiate a handover from the serving cell to the target cell. The handover command may or may not include both or one of the target cell physical cell identifier and the target cell timing offset. At 760, the flowchart 700 can end.

Figure 8:
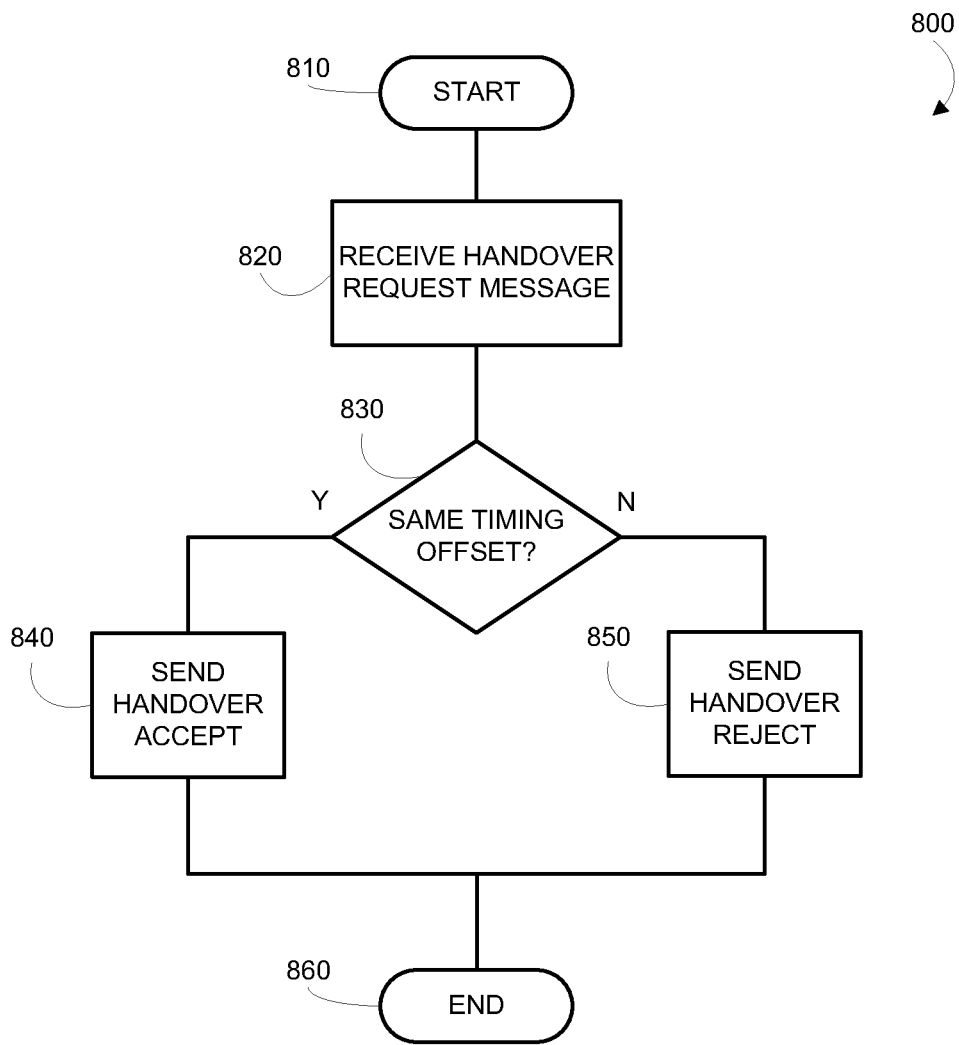
FIG. 8 is an exemplary flowchart illustrating the operation of a base station according to a possible embodiment.

FIG. 8 is an exemplary flowchart 800 illustrating the operation of a potential target cell base station, such as the base station 145, according to a possible embodiment. The potential target cell base station can be a third generation partnership project home NodeB having a physical cell identifier or can be any other potential target base station disclosed in the embodiments. At 810, the flowchart 800 begins. At 820, a handover request message including target cell timing offset information can be received at a potential target cell base station, where the potential target cell base station can have a physical cell identifier. At 830, the received target cell timing offset information can be compared with timing offset information stored at the potential target cell base station. At 840, a handover request accept message can be sent if the received target cell timing offset information is substantially equal to the stored timing offset information. At 850, a handover request reject message can be sent if the received target cell timing offset information is substantially different from the stored timing offset information. In step 860, the flowchart 800 can end.

Figure 9:
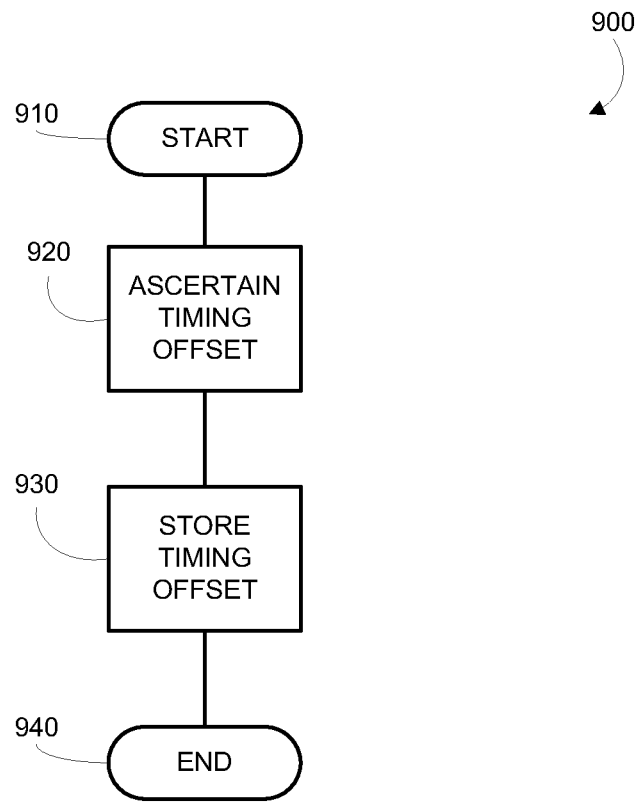
FIG. 9 is an exemplary flowchart illustrating the operation of a base station according to a possible embodiment.

FIG. 9 is an exemplary flowchart 900 illustrating the operation of a potential target base station, such as the base station 145, according to a possible embodiment. Elements of the flowchart 900 can be combined with elements of the flowchart 800. At 910, the flowchart 900 begins. At 920, timing offset information of transmitted radio frames of the potential target cell base station can be ascertained with respect to a second base station. At 930 the timing offset information of the transmitted radio frames of the potential target cell base station can be stored. At 940, the flowchart 900 can end.

Figure 10:
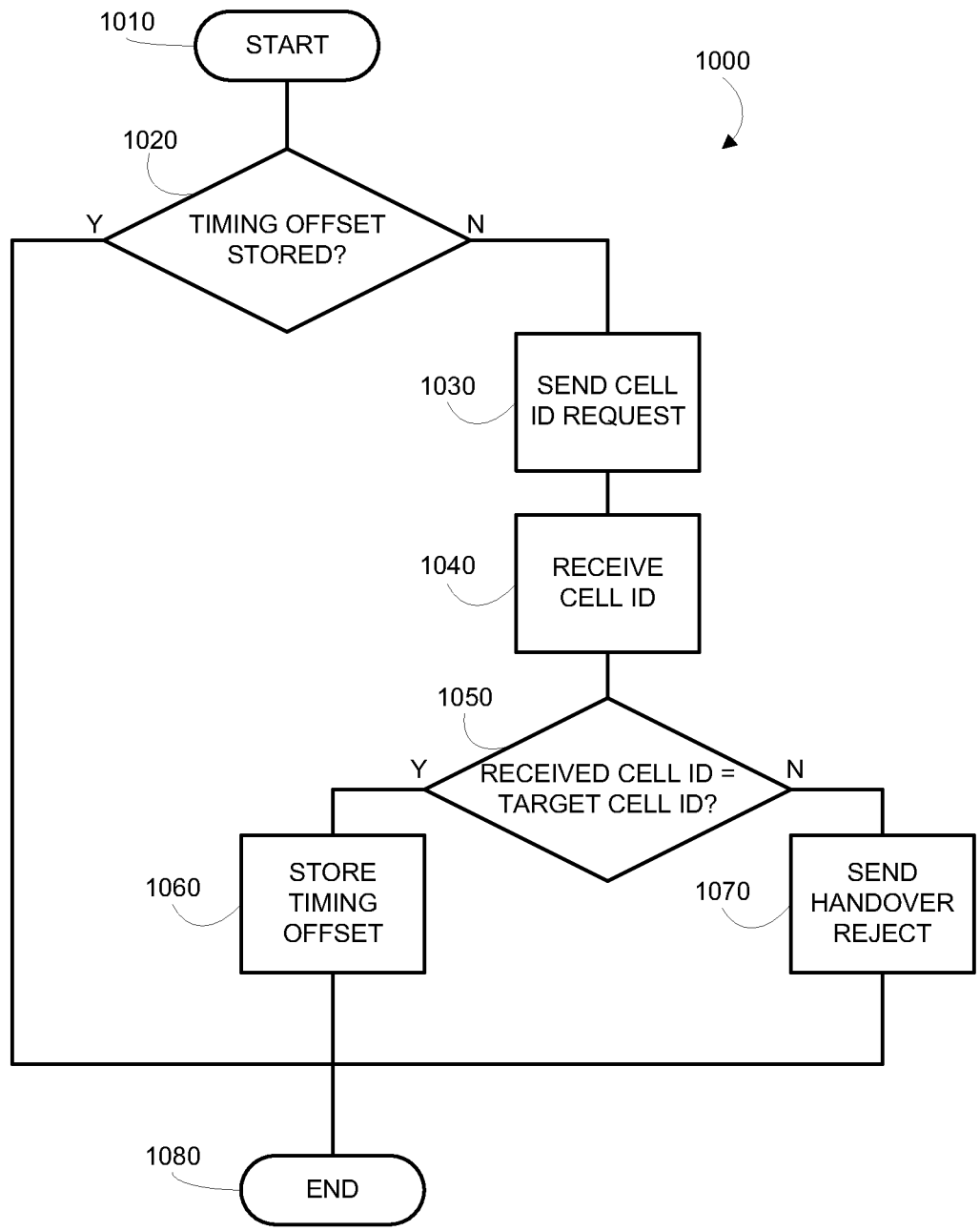
FIG. 10 is an exemplary flowchart illustrating the operation of a base station according to a possible embodiment.

FIG. 10 is an exemplary flowchart 1000 illustrating the operation of a potential target cell base station, such as the base station 145, according to a possible embodiment. Elements of the flowchart 1000 can be combined with elements of the flowchart 800 and/or elements of the flowchart 900. At 1010, the flowchart 1000 begins. At 1020, a determination can be made as to whether the timing offset information is stored at the potential target cell base station. At 1030, an additional cell identifier request message can be sent if the timing offset information is not stored at the potential target cell base station. At 1040, an additional cell identifier can be received in response to sending the additional cell identifier request message. The additional cell identifier can be a closed subscriber group cell identifier, a global identifier cell identifier, or any other additional identifier used to identify a cell or a base station. At 1050 a determination can be made as to whether the received additional cell identifier is equal to an additional cell identifier of the potential target cell base station. At 1060, the received target cell timing offset information can be stored at the potential target cell base station if the received additional cell identifier is equal to the additional cell identifier of the potential target cell base station. At 1070, a handover request reject message can be sent if the received additional cell identifier is not equal to the additional cell identifier of the potential target cell base station. At 1080, the flowchart 1000 can end.

According to some embodiments, home base stations, such as user base stations or closed subscriber group base stations, may not be synchronized to a macro network or to one another. Thus, embodiments can provide for the frame timing of the home base stations to be used to distinguish between home base stations that use the same physical cell identifier. When a wireless terminal detects a home base station, it can include, in a measurement report, the time offset between transmissions of radio frames by the serving cell and transmissions of radio frames by the home base station. The serving cell can attempt to prepare all home base stations with the reported physical cell identifier by sending a handover preparation request which can include the reported time offset. The home base station that is transmitting frames with the reported time offset with respect to the serving cell can then accept the handover request.

Same frame transmission timing can account for multipath transmissions in that a threshold can be defined such that if a wireless terminal receives two paths corresponding to the same physical cell identifier and the timing difference between the two paths is smaller than the threshold, then the wireless terminal can regard the two paths as originating from the same home base station. This can be done by choosing a threshold that is larger than a cyclic prefix.

The home base station can have a downlink receiver so that it can determine its radio frame timing offset with respect to the macro cell, such as a serving cell or a reference cell. Other options can be used to provide the timing offset to the home base station, such as by having the home base station request the timing offset from a wireless terminal via a serving cell base station. Other options can be considered based on the reference cell with respect to which the home base station timing offset is measured. For example, a home base station on a dedicated carrier can maintain its radio frame timing offset with respect to one or more macro cells on another carrier.

Some embodiments can overcome the confusion caused by physical cell identifier reuse between cells. According to some embodiments a method in a mobile station in idle state can resolve the physical cell identifier confusion between cells. The physical layer cell identifier of a first cell can be determined. Then, the radio frame time offset of the first cell relative to a reference cell can be determined. Then, whether another cell has the same physical cell identifier as the physical cell identifier of the first cell can be determined. Then, the radio frame time offset of the another cell with respect to the reference cell can be determined. Then, whether the radio frame time offset of the another cell with respect to the reference cell is the same as the radio frame time offset of the first cell relative to the reference cell can be determined. Then, the presence of the another cell can be ignored if the radio frame time offset of the another cell with respect to the reference cell is the same as the radio frame time offset of the first cell relative to the reference cell.

Some embodiments can provide a method in a mobile station in connected mode to resolve the confusion of physical cell identifiers between cells. A potential target base station signal can be measured while connected to a serving base station and the radio frame time offset of the potential target base station relative to the serving base station can be determined. A measurement report can be sent to the serving base station, where the measurement report can include the radio frame time offset of the potential target base station relative to the serving base station. A handover command can be received from the serving base station directing the mobile station to handover to the potential target base station.

Some embodiments can provide for a method in a network to resolve confusion of physical layer cell identifiers. A radio frame time offset with respect to a second cell can be assigned to a first cell. Radio frames can be transmitted from the first cell such that the radio frames are delayed by a duration equal to the radio frame time offset with respect to a second cell.

Some embodiments can provide for a method in a base station to resolve confusion of physical layer cell identifiers. A request to handover a mobile station from a first source base station can be received, where the request can include at least an identifier of a target base station for the handover. A message can be transmitted to the source base station indicating that a second identifier of the target base station is required.

The methods of this disclosure are preferably implemented on a programmed processor. However, the operations of the embodiments may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the operations of the embodiments may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. Also, relational terms, such as "top," "bottom," "front," "back," "horizontal," "vertical," and the like may be used solely to distinguish a spatial orientation of elements relative to each other and without necessarily implying a spatial orientation relative to any other physical coordinate system. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method comprising:
   receiving a handover request message including target cell timing offset information at a potential target cell base station, the potential target cell base station having a physical cell identifier;
   comparing, at the potential target base station, the received target cell timing offset information with stored timing offset information at the potential target cell base station; and
   sending a handover request accept message when the received target cell timing offset information is similar to the stored timing offset information,
   wherein the method further comprises:
   determining that timing offset information is not stored at the potential target cell base station;
   sending an additional cell identifier request message when the timing offset information is not stored at the potential target cell base station;
   receiving an additional cell identifier in response to sending the additional cell identifier request message;
   determining that the received additional cell identifier is equal to an additional cell identifier if the potential target cell base station; and
   storing the received target cell timing offset information at the potential target cell base station when the received additional cell identifier is equal to the additional cell identifier of the potential target cell base station.

2. The method according to claim 1, further comprising sending a handover request reject message when the received target cell timing offset information is substantially different from the stored timing offset information.

3. The method according to claim 1, further comprising:
   determining the received additional cell identifier is not equal to an additional cell identifier of the potential target cell base station; and
   sending a handover request reject message when the received additional cell identifier is not equal to the additional cell identifier of the potential target cell base station.

4. The method according to claim 1, wherein the additional cell identifier comprises one of a closed subscriber group cell identifier and a global identifier cell identifier.

5. The method according to claim 1, wherein the potential target cell base station comprises a third generation partnership project home NodeB having the physical cell identifier.

6. A method in a wireless terminal comprising:
   receiving a target cell physical cell identifier of a target cell;
   determining a target cell timing offset of a radio frame of the target cell with respect to reference timing of a serving cell;
   sending a measurement report including the target cell physical cell identifier and the target cell timing offset;
   receiving, when the first target cell physical identifier and the target cell timing offset do not uniquely identify a cell, an additional cell identifier request message requesting acquisition of a second target cell physical identifier;
   acquiring the second target cell physical identifier; and
   reporting the second target cell physical identifier to the target cell,
   wherein the method further comprises:
   receiving an additional cell identifier request message timing offset information is not stored at a potential target cell base station; and
   sending an additional cell identifier in respond to sending the additional cell identifier request message, where the target cell timing offset information is stored at the potential target cell base station when the sent additional cell identifier is equal to the additional cell identifier of the potential target cell base station.

7. The method according to claim 6, further comprising receiving a handover command from a base station of the serving cell to initiate a handover from the serving cell to the target cell.

8. The method according to claim 7, wherein the handover command includes the target cell physical cell identifier and the target cell timing offset.

9. The method according to claim 6, wherein determining the target cell timing offset includes measuring a timing of a radio frame from a first target cell target base station signal from the target cell to determine the timing offset with respect to the reference timing of the serving cell.

10. A base station comprising:
a base station housing;
a base station memory configured to store a physical cell identifier and store timing offset information;
a base station controller coupled to the base station housing and coupled to the base station memory, the base station controller configured to control operations of the base station;
at least one base station transceiver coupled to the base station controller, the at least one base station transceiver configured to receive a handover request message including target cell timing offset information; and
a timing offset comparison module coupled to the base station controller, the timing offset comparison module configured to compare the received target cell timing offset information with the stored timing offset information,
wherein the base station transceiver is configured to send a handover request accept message when the received target cell timing offset information is similar to the stored timing offset information,
wherein the base station controller is configured to determine that timing offset information has not been stored in the base station memory,
wherein the base station transceiver is configured to send an additional cell identifier request message when the timing offset information is not stored in the base station memory and configured to receive an additional cell identifier in response to sending the additional cell identifier request message, and
wherein the base station control is configured to determine that the received additional cell identifier is equal to an additional cell identifier of the base station and configured to store the received target cell timing offset information in the base station memory when the received additional cell identifier is equal to the additional cell identifier of the base station.

11. The base station according to claim 10, wherein the base station transceiver is configured to send a handover request reject message when the received target cell timing offset information is substantially different from the stored timing offset information.

12. The base station according to claim 10,
wherein the base station controller is configured to determine the received additional cell identifier is not equal to an additional cell identifier of the base station, and
wherein the base station transceiver is configured to send a handover request reject message when the received additional cell identifier is not equal to the additional cell identifier of the base station.

13. The base station according to claim 10, wherein the additional cell identifier comprises one of a closed subscriber group cell identifier and a global identifier cell identifier.

14. The base station according to claim 10, wherein the base station comprises a third generation partnership project home NodeB having a physical cell identifier.

15. An apparatus comprising:
a wireless communication device housing;
a wireless communication device transceiver coupled to the wireless communication device housing, the wireless communication device transceiver configured to receive a first target cell physical cell identifier of a target cell;
a wireless communication device controller coupled to the transceiver, the wireless communication device controller configured to control operations of the apparatus;
a timing offset determination module coupled to the controller, the timing offset determination module configured to determine a target cell timing offset of a radio frame of the target cell with respect to a reference timing of a serving cell; and
a measurement report transmission module coupled to the controller, the measurement report transmission module configured to transmit a measurement report including the first target cell physical cell identifier and the target cell timing offset,
wherein the wireless communication device transceiver is configured to receive an additional cell identifier request message requesting acquisition of a second target cell physical identifier,
wherein the controller is configured to acquire the second target cell physical identifier and configured to report the second target cell physical identifier to the target cell,
wherein the transceiver is configured a handover command from a base station of the serving cell to initiate a handover from the serving cell to the target cell,
wherein the handover command includes the target cell physical cell identifier and the target cell timing offset,
wherein the transceiver is configured to receive an additional cell identifier request message when timing offset information is not stored at a potential target cell base station, and
wherein transceiver is configured to send an additional cell identifier in response to sending the additional cell identifier request message, where the target cell timing offset information is stored at the potential target cell base station when the sent additional cell identifier is equal to the additional cell identifier of the potential target cell base station.

16. The apparatus according to claim 15, wherein the timing offset determination module is configured to determine the target cell timing offset by measuring a timing of a radio frame from a target cell base station signal from the target cell to determine the timing offset with respect to the reference timing of the serving cell.

17. The method according to claim 1, comprising:
ascertaining timing offset information of transmitted radio frames of the potential target cell base station with respect to a second base station; and
storing the timing offset information of the transmitted radio frames of the potential target cell base station.

18. The base station according to claim 10, wherein the base station controller is configured to determine timing offset information of transmitted radio frames of the base station with respect to a second base station and configured to store, in the base station memory, the timing offset information of the transmitted radio frames of the base station.

* * * * *